May 5, 1959  F. HILLSON  2,884,669
INSIDE CORNER INSERT FOR STEEL MOULDING
Filed June 14, 1954  2 Sheets-Sheet 1

INVENTOR.
FRANK HILLSON
BY
ATTORNEY

May 5, 1959   F. HILLSON   2,884,669
INSIDE CORNER INSERT FOR STEEL MOULDING
Filed June 14, 1954   2 Sheets-Sheet 2
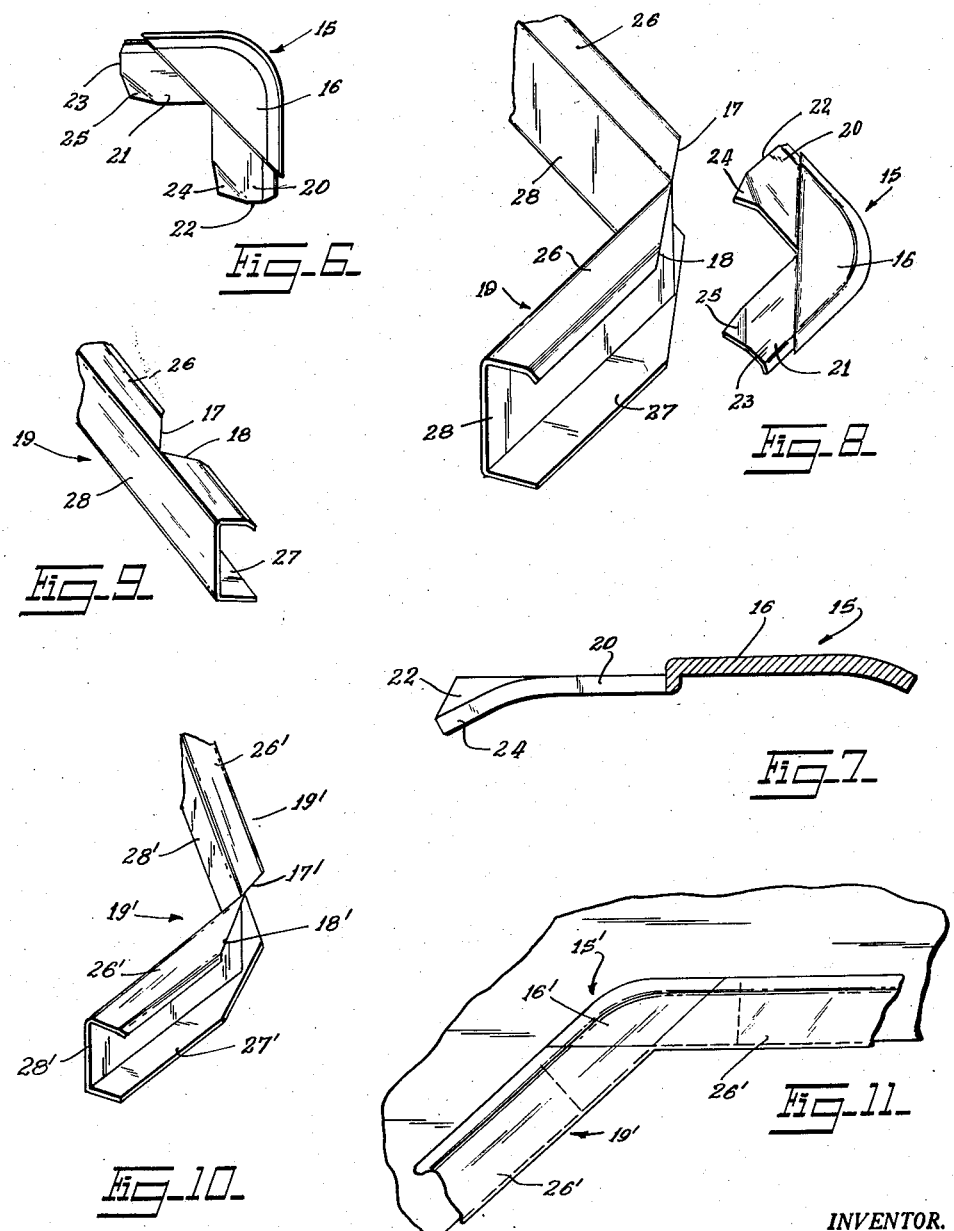
INVENTOR.
FRANK HILLSON
BY
ATTORNEY

United States Patent Office 2,884,669
Patented May 5, 1959

2,884,669

INSIDE CORNER INSERT FOR STEEL MOULDING

Frank Hillson, Irvington, N.J.

Application June 14, 1954, Serial No. 436,462

2 Claims. (Cl. 20—74)

This invention relates to new and useful improvements in moldings such as are commonly used to trim kitchen cabinet, table, wallboard and other composition board surfaces and the like.

More particularly, the present invention proposes the construction of an improved corner insert for moldings and an improved new method of forming quickly and easily attractive molding corners.

As a further object, the present invention proposes forming a metal molding corner insert for and method of making an inside corner where the surfaces to which the molding is to be applied converge inwardly to form a corner rather than converge outwardly to form the more common outside corner.

It is common to bind the edge of wallboard, laminated plastic, and other top surfaces with stainless steel molding. Such tops are used especially in kitchens as sink and table tops. The molding is generally in channel or angle form and it is no problem to form an outside corner since a ninety degree notch can be cut in the molding leg or legs of a straight length of molding with an existing tool and the molding bent until the cut edges come together to form a ninety degree outside corner. To make a forty-five degree outside corner, a forty-five degree notch is cut.

However, in order to make a one hundred and thirty-five degree or ninety degree or any obtuse angle inside corner, a difficult cutting and mitering operation is necessary, which is slow, inaccurate and generally results in a coarse job. One object of the present invention is to eliminate this and make attractive inside corners as easy to obtain as outside ones.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 6 is a view similar to Figs. 4 and 5 but showing the bottom of the plate.

Fig. 7 is an enlarged sectional view taken on line 7—7 of Fig. 4.

Fig. 8 is an enlarged perspective view of the molding bent to form the inside corner but with the corner insert plate removed.

Fig. 9 is a perspective view of the molding notched but not bent illustrating the step immediately prior to bending the molding as shown in Fig. 8.

Fig. 10 is a view similar to Fig. 8 but showing a one hundred and thirty-five degree inside corner rather than a ninety degree one.

Fig. 11 is a view similar to Fig. 2 but showing the molding of Fig. 10.

Figure 1:
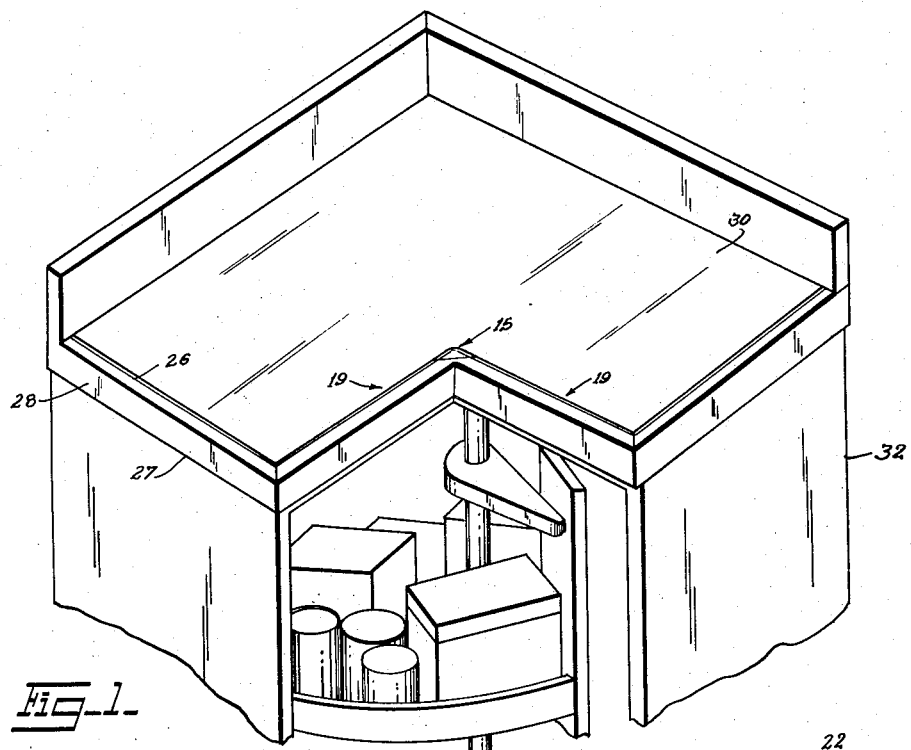
Fig. 1 is a perspective view of a cabinet having a molding and inside corner insert constructed and arranged in accordance with the present invention.
Figure 2:
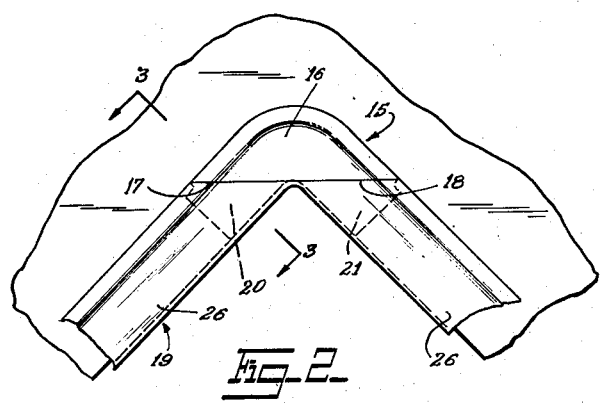
Fig. 2 is an enlarged top plan fragmentary view of the inside corner of the cabinet with molding and corner insert.
Figure 3:
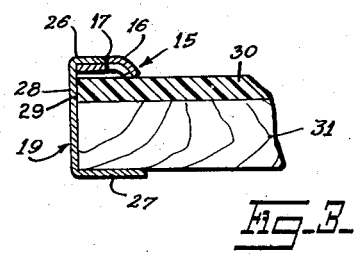
Fig. 3 is a sectional view taken on line 3—3 of Fig. 2.
Figure 4:
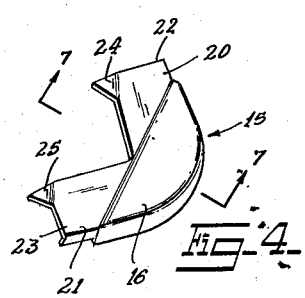
Fig. 4 is a perspective view of the corner insert plate shown in Figs. 1, 2 and 3.
Figure 5:
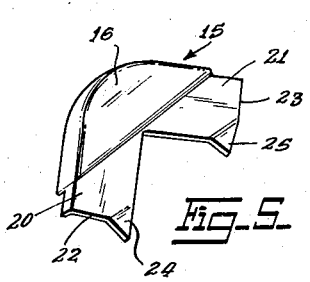
Fig. 5 is a view similar to Fig. 4.

The corner insert plate 15 of the present invention preferably is of stainless steel and formed to match existing moldings. Preferably the plate 15 is stamped out and stamped in such pattern or shape as the decorative surface of present moldings.

Plate 15 has a raised body portion 16 adapted to fit between angularly disposed edge portions 17 and 18 of a molding or molding strip 19 as a corner continuation of the molding. Two arms 20 and 21 extend from the body portion 16 of the plate. These spaced arms 20 and 21 are angularly disposed and as shown are divergent at an obtuse angle for disposal beneath the angularly disposed edge portions 17 and 18 of the molding 19.

The plate 15 shown is of thin, stiffly flexible stainless steel and the arms 20 and 21 hence are stiffly flexible. Arms 20 and 21 have free ends 22 and 23 with downwardly disposed free end portions 24 and 25, respectively. These portions 24 and 25 are located at the inside corners of the free ends 22 and 23.

Molding 19 is in channel form and has an upper leg 26, a lower leg 27 and a web 28. The molding 19 fits over the edge 29 of a composition top 30 resting on a base 31 of a kitchen cabinet 32. The angularly disposed edge portions 17 and 18 on the upper leg 26 of the molding 19 fit over the arms 20 and 21 of the corner insert plate 15 and when the molding is secured to the cabinet the arms 20 and 21 are frictionally secured to the molding as the downwardly disposed corners 24 and 25 are drawn toward flattened condition.

To make an inside corner by my method and using the insert of my invention, a straight length of molding 19 (see Fig. 9) is notched at the proper place as with a ninety degree notch cutting tool. Then, instead of bending the molding together as is done for a ninety degree outside corner, the molding is bent the other way (see Fig. 8), the ninety degree notch being increased to an obtuse angle. The corner insert plate 15 is then placed into position with its arms 20 and 21 under the angularly disposed edge portions 17 and 18 of the molding 19 and the molding is jammed into position on the cabinet top 30 or similar surface. The insert plate 15 is thus self-contained but it may be soldered also if desired.

The modification of the invention shown in Figs. 10 and 11 is merely to illustrate how the insert plate can be made to fit a one hundred and thirty-five degree inside corner or any other degree. The parts being similar, they are given reference numbers the same as in the other figures, but primed to distinguish the figures.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A corner insert for mouldings comprising a thin flat stiffly flexible plate having a substantially triangular-shaped body adapted to fit between angularly disposed flat edge portions of a moulding as an inner corner continuation of the molding, two edges of the body being curved and converging to form a curved corner, the third edge of the body being straight and forming acute angles at its ends with said two edges, two divergent flat arm portions extending from the straight edge, constituting extensions of the curved edges of the body, said arm portions being disposed on a plane below the plane of the body of the plate forming a continuous shoulder along the straight edge thereof for abutment against the angularly disposed side edge portions of the moulding, said extensions terminating in rectangular end edges for disposal beneath the angularly disposed edge portions of a moulding, the inner corner of each rectangular end edge being bent downwardly out of the plane of the extension for preventing displacement of the insert, said straight edge forming acute angles with said rectangular end edges, the inner edges of the extensions intersecting, said intersection being squared off.

2. A corner insert for mouldings comprising a thin, flat stiffly flexible plate having a substantially triangular-shaped body adapted to fit between angularly disposed flat edge portions of a moulding as an inner corner continuation of the moulding, two edges of the body being curved and converging to form a curved corner, the third edge of the body being straight and forming acute angles at its ends with said two edges, two divergent flat arm portions extending from the straight edge, constituting extensions of the curved edges of the body, said arm portions being disposed on a plane below the plane of the body of the plate, forming a continuous shoulder along the straight edge thereof for abutment against the angularly disposed side edge portions of the moulding, said extensions terminating in rectangular end edges for disposal beneath the angularly disposed edge portions of a moulding, the inner corner of each rectangular end edge being bent downwardly out of the plane of the extension for preventing displacement of the insert, said straight edge forming acute angles with said rectangular end edges, the inner edges of the extensions intersecting, said intersection being squared off and a downwardly flaring integral flange along the peripheries of the curved edges of the body forming a continuation of the flange of a moulding.

References Cited in the file of this patent

UNITED STATES PATENTS

| | | |
|---|---|---|
| 1,015,484 | Erickson | Jan. 23, 1912 |
| 1,250,594 | Knapp | Dec. 18, 1917 |
| 1,825,010 | Murphy | Sept. 29, 1931 |
| 2,585,961 | Norquist | Feb. 19, 1952 |
| 2,669,862 | Miller | Feb. 23, 1954 |
| 2,674,768 | Everhart et al. | Apr. 13, 1954 |
| 2,699,234 | Spieth | Jan. 11, 1955 |

FOREIGN PATENTS

| | | |
|---|---|---|
| 925,679 | France | Mar. 31, 1947 |